Patented Dec. 8, 1936

2,063,211

UNITED STATES PATENT OFFICE 2,063,211

NAPHTHALENE DERIVATIVES

Max Wyler and Robert William Kersey, Blackley, Manchester, England, assignors to Imperial Chemical Industries Limited, a corporation of Great Britain No Drawing. Application April 5, 1934, Serial No. 719,232. In Great Britain April 7, 1933

8 Claims. (Cl. 260—129)

Aminonaphthol sulphonic acids are very valuable intermediates for the manufacture of dyestuffs. According to the present invention we manufacture the previously unknown 2-amino-1-naphthol-sulphonic acid by nitrosating 1-naphthol-8-sulphonic acid and reducing the resulting product.

The nitrosation may be effected by any of the known general methods, such for example as treatment of the sodium salt with sodium nitrite and hydrochloric acid.

For reduction of the nitroso-compound the usual methods may be used, e. g. reduction with zinc or iron and hydrochloric or sulphuric acid, or with sodium sulphide or sodium hydrosulphite.

The following example in which parts are by weight illustrates but does not limit the invention:—

Example.—To a solution of 180 parts of 1-naphthol-8-sulphonic acid in 1500 parts hot water made alkaline with slight excess of caustic alkali is added 60 parts sodium nitrite. The mixture is run into a well-stirred mixture of 250 parts of hydrochloric acid and 750 parts of crushed ice and the yellow crystalline precipitate which separates is filtered off and washed with brine.

From the alkaline solution of this nitroso body sodium chloride precipitates a yellow alkaline salt, which is characterized by the formation of a bright green compound with an iron salt, this reaction being common to o-nitrosonaphthol derivatives.

The product is pasted to a thin cream with water, 200 parts of finely ground iron are stirred in and hydrochloric acid added until an acid reaction to congo-red persists; the suspension is then grey colored. After cooling the reaction mixture, the product is separated by filtration, washed with cold water, dissolved in hot aqueous sodium carbonate solution and filtered into excess of hydrochloric acid. 2-amino-1-naphthol-8-sulphonic acid separates in colorless needles.

It forms colorless needless almost insoluble in cold water. It readily dissolves in sodium acetate solution from which the sodium salt can be precipitated in grey crystals. Sodium carbonate solutions readily oxidize to a red-brown color and with caustic soda a characteristic deep green color is formed.

With sodium nitrite and acid a yellow crystalline body is formed, but normal diazotization takes place in presence of a copper salt, e. g. copper sulphate and the diazo compound can be coupled with azo components.

The invention is not limited to the methods of nitrosation and reduction, or to the specific conditions, given in the above example. Variations of these conditions and other known general methods of nitrosation and reduction may be employed without departing from the spirit of the invention as set out in the following claims.

It is obvious that salts of the new 2-amino-1-naphthol-8-sulphonic acid may be obtained by neutralizing the acid with suitable alkalies or bases or by double decomposition of the sodium salt or other soluble salt with suitable compounds of metals forming insoluble or sparingly soluble 2-amino-1-naphthol-8-sulphonates.

We claim:—

1. Process for the production of 2-amino-1-naphthol-8-sulphonic acid, which comprises nitrosation of 1-naphthol-8-sulphonic acid and reduction of the resulting nitroso-compound.

2. Process for the production of 2-amino-1-naphthol-8-sulphonic acid, which comprises treating an aqueus solution of a soluble salt of 1-naphthol-8-sulphonic acid with a soluble nitrite and hydrochloric acid, and subsequently reducing the resulting nitroso-compound.

3. Process according to claim 2 in which the reduction of the nitroso-compound is effected by means of iron and hydrochloric acid.

4. The step in the production of 2-amino-1-naphthol-8-sulphonic acid which consists in treating 1-naphthol-8-sulphonic acid with a nitrosating agent.

5. The step as claimed in claim 4 in which the nitrosating agent is sodium nitrite and hydrochloric acid.

6. 2-amino-1-naphthol-8-sulphonic acid.

7. Process for the production of 2-amino-1-naphthol-8-sulfonic acid and alkali metal salts thereof having the general formula—

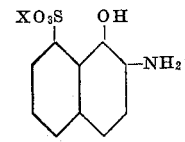

in which X stands for one of the group consisting of hydrogen and an alkali metal, said process comprising nitrosation of 1-naphthol-8-sulfonic acid and reduction of the resulting nitroso-compound followed by neutralization of the 2-amino-1-naphthol-8-sulfonic acid by treatment with an alkali metal salt forming material.

8. 2-amino-1-naphthol-8-sulfonic acid and salts thereof having the general formula—

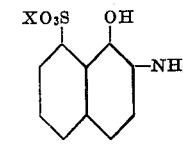

in which X represents one of the group consisting of hydrogen and an alkali metal.

MAX WYLER.
ROBERT WILLIAM KERSEY.